June 12, 1928.

H. M. R. DAM 1,673,402

ELECTRIC BATTERY AND PROCESS FOR MANUFACTURING BATTERY CELLS

Filed May 1, 1925   4 Sheets-Sheet 1

INVENTOR
Henry M. Rosendal Dam
BY
Williams & Morse
ATTORNEYS.

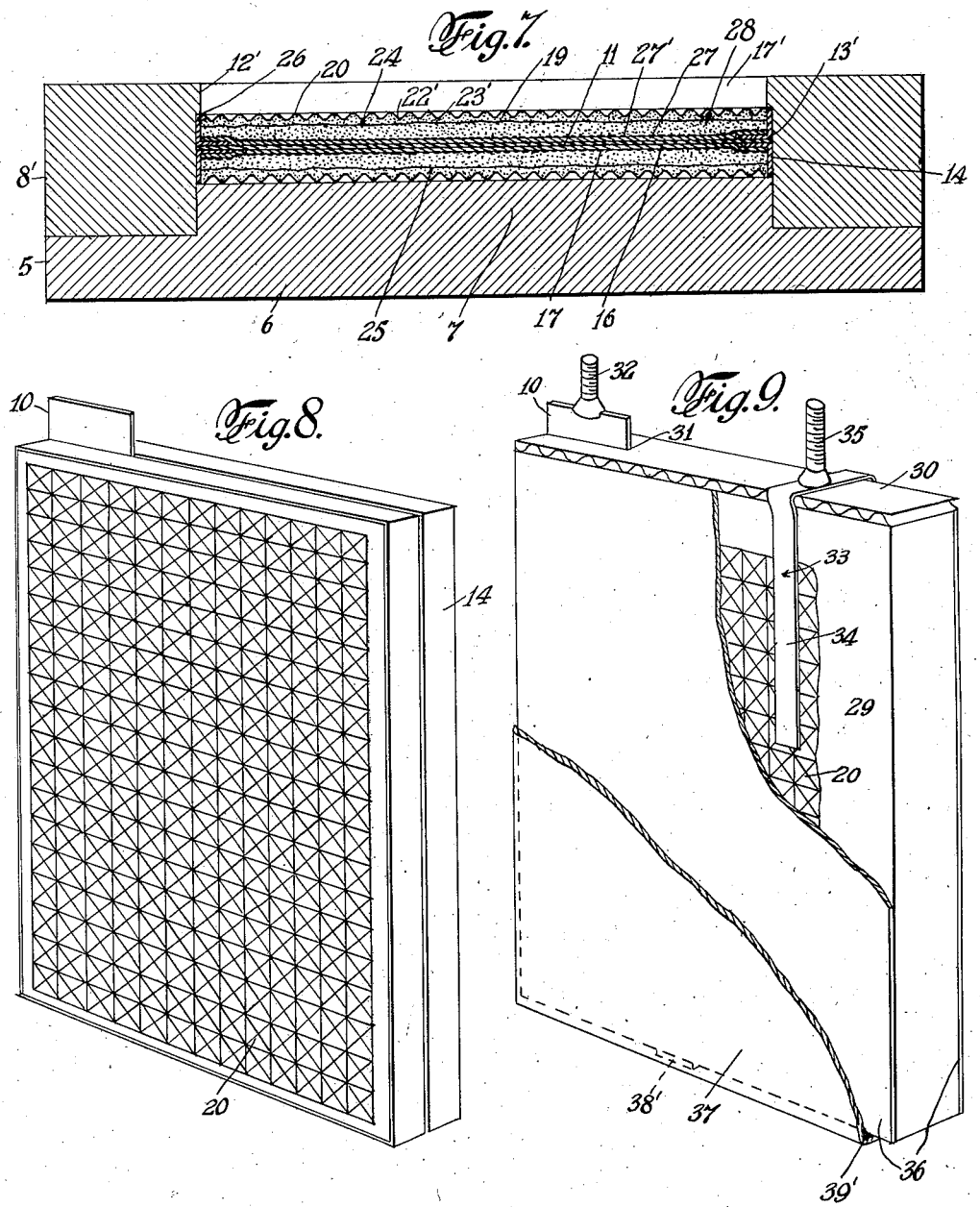

June 12, 1928.  
H. M. R. DAM  
1,673,402
ELECTRIC BATTERY AND PROCESS FOR MANUFACTURING BATTERY CELLS
Filed May 1, 1925  4 Sheets-Sheet 4
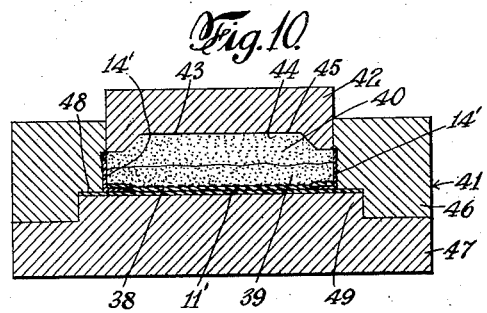
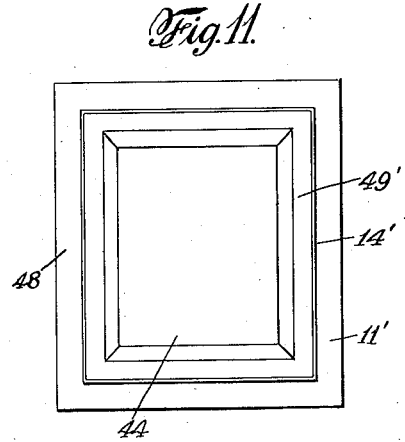
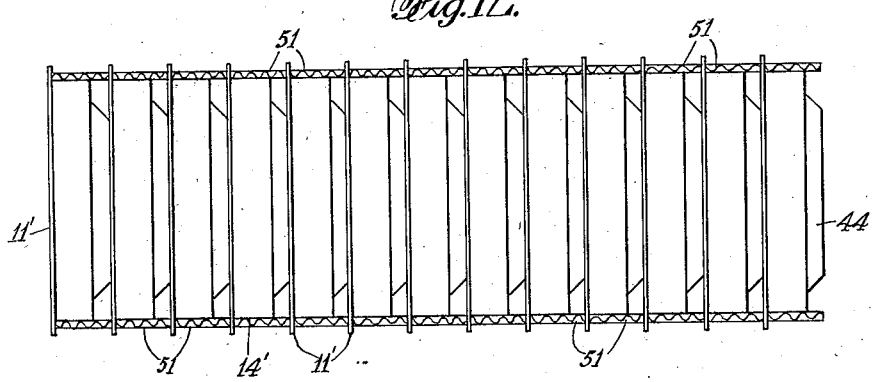
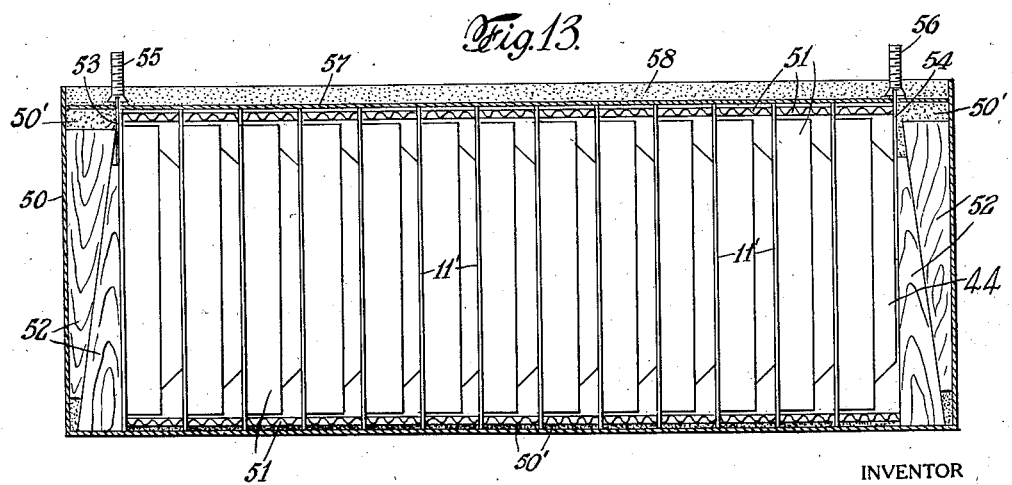
INVENTOR  
Henry M. Rosendal Dam  
BY  
Williams & Morse  
ATTORNEYS.

Patented June 12, 1928.

1,673,402

UNITED STATES PATENT OFFICE.

HENRY M. ROSENDAL DAM, OF ASTORIA, NEW YORK, ASSIGNOR TO PREMO ELECTRIC CORPORATION, A CORPORATION OF NEW YORK.

ELECTRIC BATTERY AND PROCESS FOR MANUFACTURING BATTERY CELLS.

Application filed May 1, 1925. Serial No. 27,133.

This invention relates to electric batteries of the flat cell type and to a process for manufacturing the cells entering into the battery.

An important object of the invention is to provide a generally improved battery of the character mentioned together with an improved process for facilitating the manufacture of the cells entering into the battery structure.

A further object of the invention is to provide a battery so constructed as to materially increase the ampere-hour capacity, reduce the internal resistance, and immediately deliver the rated voltage after a relatively long period of inactivity.

Other objects and certain advantages of the invention will become apparent from the following description when taken in connection with the accompanying drawings in which—

Figure 7 is a transverse sectional view through a die similar to that shown in Figures 1 to 6 but of such dimensions as to receive a cell of the type shown in Figure 6 upon which an identical cell is adapted to be formed, and shows at its lower part a cell such as is shown in Figure 6 in inverted position and completely formed upon it another similar cell.

Figure 8 is a perspective view of two cells constructed and united in accordance with the disclosure of Figure 7.

Figure 9 is a view similar to Figure 8 but showing also a container for the battery.

Figure 10 is a transverse sectional view through a die so constructed as to produce a slightly modified form of cell.

Figure 11 is a face view of a cell constructed in accordance with the disclosure of Figure 10.

Figure 12 is a view, partly in section and partly in elevation, showing a plurality of cells arranged in a face to face relation and thus electrically connected in series.

Figure 13 is a view similar to Figure 12 showing the several cells arranged within a suitable container and urged into an intimate face to face relation by means of wedging devices.

Figure 1:
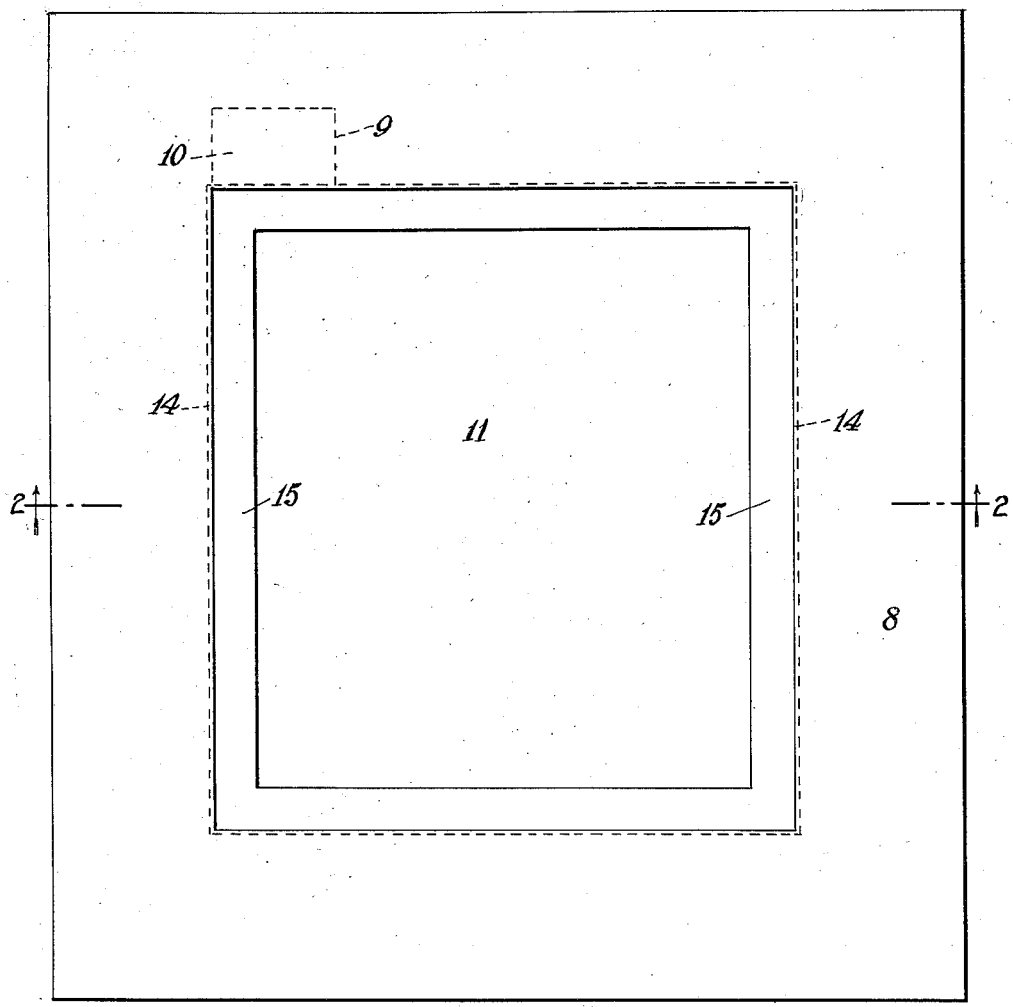
Figure 1 is a plan view of a mold adapted to be used in carrying out the process with the zinc plate and an insulating frame in position therein.

In the drawings wherein for the purposes of illustration are shown certain apparatus for carrying out the several steps incident to the process embodying the invention and wherein are also shown certain modified forms of cells and batteries embodying the invention, the numeral 5 indicates a die or mold comprising a base plate 6, having a raised portion 7 around which is adapted to be placed a chase 8 which is cut away as shown at 9 to provide a pocket adapted for the reception of a wing 10 of a zinc plate 11 which constitutes a negative electrode common to the two cells hereinafter more particularly described entering into the structure shown in Figures 7 to 9, inclusive.

It will be noted that the chase 8 is provided with a shouldered flange 12 which forms with the upper face of the raised portion 7 of the die a recess 13 into which a frame 14 of angular cross-section and constructed from a suitable insulating material, such as cardboard, is adapted to be fitted when placed upon the zinc plate 11. This frame may be impregnated or coated with a suitable material, such as paraffin in order to render the same impervious to moisture. It has a horizontal flange 15 adapted to rest upon and snugly engage the margin of the zinc plate 11 which rests upon the upper face of the raised portion 7 of the die, and it is held firmly in this position by the shouldered flange 12 of the chase 8.

After properly positioning the frame 14 and zinc plate 11 within the die, a suitable carrier, such as a pulp board 16, carrying a suitable quantity of moisture, is so placed within the frame 14 as to rest upon the flange 15 thereof. This pulp board is adapted to carry a suitable electrolyte in the form of a paste 17 applied to both faces of the pulp board.

Figure 3:
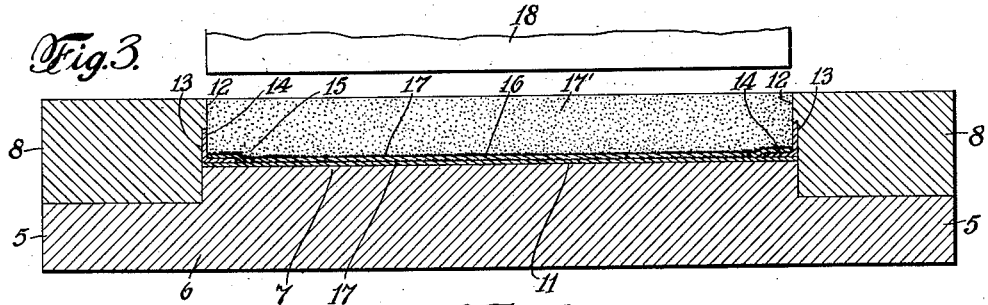
Figure 3 is a similar view showing the depolarizing mix as having been introduced into the mold and scraped off flush with the top thereof.
Figure 4:
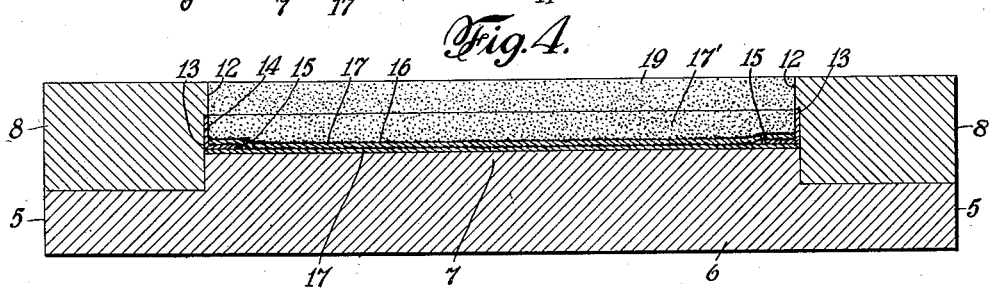
Figure 4 is a similar view showing a quantity of graphite as having been introduced into the mold subsequent to the compression of the depolarizing mixture.
Figure 5:
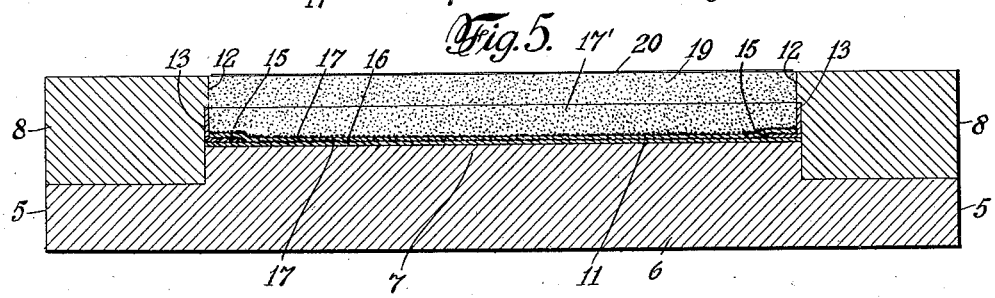
Figure 5 is a similar view showing a metallic layer of material, such as tin foil, as having been placed in position upon the layer of graphite prior to final compression.

After placing the pulp board in position upon the flange 15 a suitable quantity of depolarizing mixture 17′, consisting, for example, of suitable proportions of manganese, graphite and sal ammoniac, is introduced into the chase 8. The depolarizing mixture is, upon being introduced into the chase 8, piled up above the upper face of the chase then scraped off level and subjected to compression by a plunger or die member 18, adapted to enter the chase 8. The plunger 18 (see Fig. 3), upon entering the chase 8, depresses the depolarizing mixture to a lower level for example, such as is shown in Figures 4 and 5, forming the depolarizing mixture into a relatively compact mass. As a result of the depolarizing mixture having been compressed, a sufficient space is afforded at the top of this material, upon removing the plunger 18, to accomodate a quantity of graphite which is introduced into the chase 8 and spread over the surface of the depolarizing mix to form a graphite layer 19, the upper surface of which lies flush with the upper surface of the chase 8. In preparing the graphite a suitable quantity of wax is mixed with it, after which the mixture is ground into powdered form, the wax being equally distributed with respect to the graphite and serving to render the graphite mass impervious to moisture after compression, as will be readily understood.

After the layer of graphite has been introduced into the die as shown in Figure 4 this layer is heated, as by means of a blow-torch, for the purpose of softening the wax in order to render the mass more or less plastic, thus enabling it to readily respond to the compression force to be subsequently exerted upon it. After heating the layer of graphite, a metallic facing such, for example, as tin foil 20 is placed upon the graphite layer as shown in Figure 5. With the tin foil so positioned the depolarizing mix, graphite layer and tin foil are collectively subjected to compression by means of a second plunger or die member 21. The lower or compression face of this plunger is provided with a plurality of lobes and pockets 22 and 23, respectively, in order to form a plurality of depressions and protuberances 22′ and 23′, respectively, in the face of the graphite layer, which layer becomes, as a result of the compression, a compact mass adapted to be utilized as the positive element of a cell. Inasmuch as the metallic facing 20 assumes a contour corresponding to the contour of the face of the graphite element, a relatively large surface contact is provided between the metallic facing and the graphite. Not only is a relatively large contact area thus afforded between the metallic facing 20 and the graphite, which results in a minimum resistance to an electric current flowing from one of these elements to the other, but, by reason of the fact that the tin foil conforms to the irregular face of the graphite element, a highly effective physical union is established between the contacting surfaces of these elements.

Figure 2:
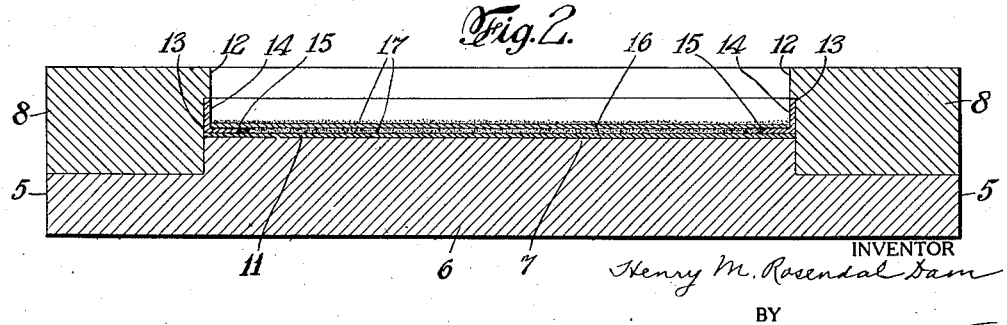
Figure 2 is a transverse sectional view taken on line 2—2 of Figure 1, showing in section the zinc plate, insulating frame and electrolyte-paste-covered pulp board.

Inasmuch as the pulp board 16, carrying the electrolyte on both faces, is relatively pliant it is distorted from its position shown in Figure 2 and forced into intimate contact, substantially throughout its entire area, with the zinc plate 11 as shown in Figures 3 to 7, inclusive, upon initial compression of the depolarizing mixture. In subjecting the graphite layer 20 to compression the depolarizing mixture is incidentally subjected to final compression and forced to the level shown in Figure 6, the pulp board 16 being at the same time urged into further intimate contact with the zinc plate 11.

Figure 6:
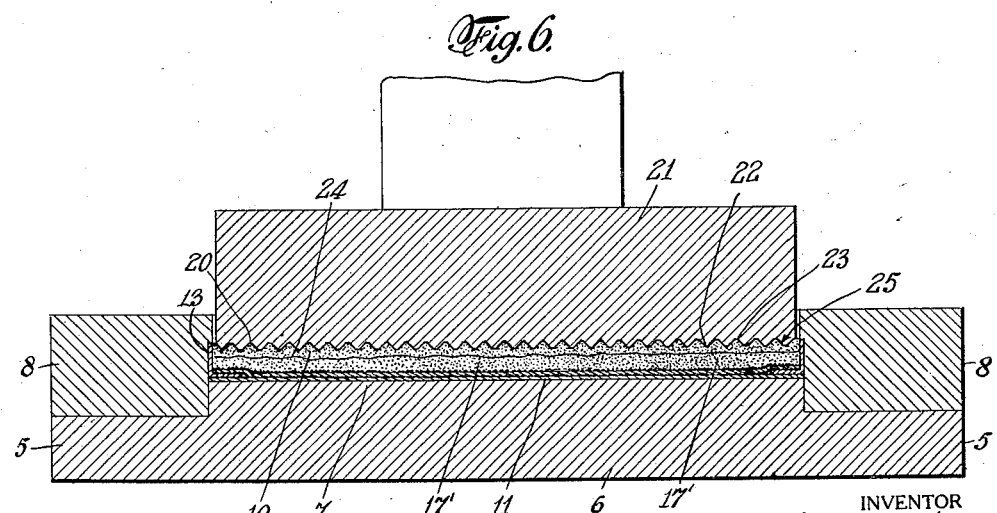
Figure 6 is a similar view showing the graphite with the layer of tin foil as having been subjected to final compression in completing the formation of a cell embodying my invention.

Since the depolarizing mix 17′ and the graphite layer 19 are more or less plastic or yieldable under the influence of final compression, the line of initial jointure intermediate the depolarizing mix and graphite is distorted, due to possible variations in mass density of the depolarizing mix and graphite, from a straight line contact, shown in Figures 4 and 5, to an irregular contact as indicated by the undulatory line of demarcation 24 in Figure 6. The irregular surface produced between contacting faces of the depolarizing mass and graphite element, as will be readily understood, serves to provide for a more intimate and permanent keying engagement between the graphite and the depolarizing mass than if these two materials were united on a straight plane such as exists between the depolarizing mass and graphite layer at the outset of the final compression.

Upon completion of the final compression the cell comprising the zinc plate or negative electrode 11, the frame 14, the pulp board 16 functioning as a vehicle for the electrolyte, the depolarizing material 17′, the layer of graphite 19, compressed to provide the positive electrode of the cell, and the metallic layer 20, may be readily removed as a compact and intimately united structure upon which a second cell, utilizing the zinc plate of the first cell as a negative electrode, may be formed as will now be described.

In carrying the process further into effect, a complete cell such as is shown in Figure 6 and indicated as a whole by the numeral 25, is placed in inverted position, with the zinc plate or electrode 11 uppermost, upon the upper face of the raised portion 7 of the base plate 6, as shown in Figure 7, whereupon a second chase 8', containing a second insulated frame 26, is placed upon the base plate 6 in the position shown in Figure 7. This chase 8' is substantially identical with the chase 8, hereinbefore described, except that it is of such a thickness as to form a recess 13', intermediate the raised portion 7 of the base plate 6 and the shouldered flange 12' of the chase 8', which is sufficiently deep to accommodate the first cell 25 and the second frame 26 superimposed upon the outer face of the zinc plate or electrode 11 of the first cell. The second frame 26 is identical with the frame 14 of the first cell and in building up the second cell a pulp board 27, carrying a suitable quantity of moisture and covered on both faces with an electrolytic paste 27' is introduced into the chase 8'. After properly positioning the pulp board 27 within the chase 8', the depolarizing mixture 17' is introduced into the mold and compressed as previously described in the formation of the cell 25. After compressing the depolarizing mixture 17' a quantity of graphite 19 is introduced into the chase 8' and this graphite is subjected to heat, such as of a blow torch, for the purpose previously described. Subsequent to heating the graphite layer a metallic facing such as tinfoil 20 is applied thereto whereupon the graphite layer 19 is subjected to compression by means of the die member 21. As a result of this compression the graphite layer 19 is compressed into a relatively compact mass adapted to function as a positive electrode having depressions and protuberances 22' and 23', respectively, formed upon its face.

As a result of the successive steps carried out subsequent to the completion of the first cell 25, a second cell 28 is formed, the cell 28 being substantially identical with the cell 25 and the several steps incident to the production of the same being substantially identical with the respective corresponding steps employed in forming the cell 25.

Upon completion of the cell 28 the two cells shown in Figure 7 may be removed from the chase 8' as a unitary structure in which the zinc plate 11 functions as a negative electrode common to the two cells. The outer margin of the battery as thus far completed, is next dipped into wax in order to seal the several joints and thereby render the structure airtight and moisture-proof. It will be noted from Figure 9 that the film of wax 29 extends over the faces of the graphite layers 19 only a relatively short distance leaving a relatively large area of the metallic facing exposed. Upon the top of the battery there is positioned strips of flat and corrugated cardboard 30, preferably impregnated or coated with paraffin, and being split, as shown at 31, to receive the projecting wing 10 of the zinc plate, to which wing a suitable binding post 32 is connected. After positioning the strips of cardboard 30 as shown, a metallic yoke 33, provided with a terminal 35, is placed upon the battery with its legs, one of which is indicated by the numeral 34, in contact with the metallic facings 20, thereby electrically connecting the positive electrodes of the battery to each other. After positioning the yoke 33 as shown, cardboard facings 36, preferably impregnated or coated with wax, are applied to opposite sides of the battery and the battery is then introduced into a suitable cardboard container 37 and seated upon a cardboard spacer 38'. A suitable sealing material, such as wax or pitch 39', is then poured around the battery, filling the space afforded between the battery and the wall of the container. This sealing material functions to reinforce the battery, in its entirety, and to further render the same airtight and impervious to moisture. After introducing the sealing materials 39', as described, the battery is finally sealed in accordance with usual practice by pouring over the top of the same a quantity of sealing wax.

In constructing the modified form of cell shown in Figures 10 to 13, inclusive, the several steps corresponding to the steps employed in constructing the cell 25 are carried out, that is to say, the zinc plate 11' is positioned within a mold 41, as shown in Figure 10, with the cardboard frame 14' resting upon the zinc plate 11'. After positioning the zinc plate 11' and the cardboard frame 14' as shown, a pulp board 38, carrying a suitable quantity of moisture and covered on both sides with suitable electrolytic paste, is introduced and upon this pulp board is formed a layer of compressed depolarizing mixture 39. After compressing the depolarizing mixture a quantity of powdered graphite 40, into which may be incorporated a suitable quantity of wax, is introduced into the mold and thereafter subjected to compression by a plunger or die member 42. This plunger or die member, however, is cut out to provide a pocket 43, as a result of which the compressed graphite 40, which functions as the positive electrode of the cell, is provided with a protruding portion 44 adapted to contact with the zinc plate 11' which is the negative electrode of the adjacent cell when the several cells are positioned in a face to face relation as shown in Figure 12. In order to render the graphite 40 more or less plastic so as to enable it to respond to the action of the die member 42 the graphite may be subjected to heat, such as of a blow torch. A metallic facing such as tin foil 45 may then be placed upon the graphite and united therewith upon the application of pressure by the die member 42. If desired, the die member 42 may be provided with depressions and protuberances identical with those disclosed in Figure 6, and hereinbefore described, for the purpose of increasing the contact area between the graphite and tin foil and for the purpose also of effecting an intimate physical union between these two elements.

From the description of the modified form of cell, shown in Figures 10 to 13, inclusive, it will be apparent that the method of constructing such cell is identical with the process hereinbefore described in connection with Figures 1 to 6, inclusive, and that the form of cell shown in Figures 10 to 13, inclusive, is substantially identical with the form of cell indicated by the numeral 25 except, however, that the positive electrode is provided with a protruding portion and the negative electrode or zinc plate 11' overlies or projects beyond the cardboard frame 14 an appreciable distance instead of terminating flush therewith. Inasmuch as the zinc plate 11' or negative electrode projects beyond or overlies the frame 14' a slight modification in the upper and lower sections 46 and 47 of the die 41 is necessitated, the section 41 being undercut as shown at 48 to receive the plate and the raised portion 49 of the lower section.

After the cell has been formed it may be removed from the mold 41, as a unit, and coated around its margin or edge with paraffin to provide a film 49' similar to the film indicated by the numeral 29 in Figure 9.

Prior to introducing the cells into a suitable container, such as is indicated by the numeral 50, each may be provided with a strip of corrugated board 51 extending entirely around the same. After introducing the cells into the container 50 in an end to end relation with the positive electrode of each cell abutting the negative electrode of the adjacent cell suitable wedges, such as are indicated by the numeral 52, are introduced into the container at opposite ends thereof. These wedges are employed for the purpose of urging the cells into intimate face to face engagement with each other. Before introducing the wedges 52, however, contact strips 53 and 54, carrying terminals 55 and 56 are placed respectively in contact with the zinc electrode of the cell at one end of the battery and in contact with the positive electrode of the cell at the opposite end of the battery. These contact strips under the influence of the wedging action of the wedge 52 are urged into intimate engagement with the opposed electrodes of the battery. After assembling the cells in an end to end relation within the container 50 and urging them into intimate engagement with each other a suitable sealing material such as wax or pitch 50' is poured around the cells and a strip of cardboard 57, or other insulating material, is then positioned as shown upon the upper edges of the zinc plates 11'. Upon this strip of cardboard is poured a quantity of suitable sealing material such as wax 58 which functions as a means for sealing the battery thus rendering the same impervious to moisture.

Certain advantages are to be derived from a battery made up of a plurality of cells of the type shown herein but claimed in my copending application Serial No. 27,134, filed May 1, 1925, in each of which cells the electrolyte is applied to both sides of the carrier such as pulp board, rather than upon only that side of the carrier adjacent the negative electrode as has heretofore been customary. One advantage is a material increase in ampere-hour capacity. Another advantage is the materal reduction in internal resistance offered within each cell. A further advantage resides in the fact that the battery immediately delivers its rated voltage after a relatively long period of inactivity.

Having thus described my invention I claim:

1. The process of producing a battery cell which consists in compressing a quantity of depolarizing mixture upon a negative electrode with intervening electrolyte so as to unite the electrode and depolarizing mixture, and compressing a quantity of positive electrode-forming material upon the depolarizing mixture, thereby forming a positive electrode and simultaneously uniting the same with the depolarizing mixture.

2. The process of producing a battery cell which consists in compressing a quantity of depolarizing mixture upon a negative electrode with intervening electrolyte so as to unite the electrode and depolarizing mixture, superimposing upon the depolarizing mixture a quantity of positive electrode-forming material, applying a metallic facing to the positive electrode-forming material, and compressing said positive electrode-forming material upon the depolarizing mixture, thereby forming a positive electrode and simultaneously uniting the same with the depolarizing mixture and said facing.

3. The process of producing a battery cell which consists in applying to a negative electrode a carrier coated with an electrolyte, superimposing upon the carrier a quantity of depolarizing mixture, compressing the depolarizing mixture into cake form thereby uniting the same together with the electrolyte and negative electrode into a unitary structure, superimposing upon the depolarizing mixture a quantity of positive electrode-forming material, and compressing the positive electrode-forming material thereby forming a positive electrode and simultaneously uniting the same with the depolarizing mixture.

4. The process of producing a battery cell which consists in applying to a negatve electrode a carrier coated with an electrolyte, superimposing upon the carrier a quantity of depolarizing mixture, compressing the depolarizing mixture into cake form thereby uniting the same together with the electrolyte and negative electrode into a unitary structure, superimposing upon the depolarizing mixture a quantity of positive electrode-forming material, applying a metallic facing to the positive electrode-forming material, and compressing the positive electrode-forming material thereby forming a positive electrode and simultaneously uniting the same with the depolarizng mixture and said facing.

5. The process of producing a battery cell which consists in applying to a negative electrode a carrier provided with an electrolyte, superimposing upon the carrier a quantity of depolarizing mixture, compressing the depolarizing mixture into cake form and simultaneously uniting the same with the negative electrode and electrolyte in a unitary structure, superimposing upon the depolarizing mixture a quantity of carbonaceous material having an impregnating substance mixed therewith, subjecting the carbonaceous material to heat, superimposing upon the carbonaceous material a metallic conductor, and subjecting the conductor, carbonaceous material, and depolarizing mixture to pressure whereby the conductor, carbonaceous material, depolarizing mixture, negative electrode, carrier and electrolyte are united in a unitary structure.

6. The process of producing a battery cell which consists in applying a frame of insulating material to a negative electrode, applying to the negative electrode an electrolyte, introducing into the frame a quantity of depolarizing mixture, subjecting the depolarizing mixture to pressure to produce a cake of such material and physically unite the mixture to the negative electrode, superimposing upon the depolarizing mixture a quantity of positive electrode-forming material, and subjecting the positive electrode-forming material to pressure to reduce the positive electrode-forming material to cake form and physically unite the same to said depolarizing mixture whereby said negative electrode, electrolyte, frame, depolarizing mixture, and positive electrode-forming material are united into a unitary structure.

7. The process of producing a battery cell which consists in applying to a negative electrode a frame, introducing into the frame a carrier coated with an electrolyte, introducing into the frame a quantity of depolarizing mixture, subjecting the depolarizing mixture to pressure to produce a cake of such mixture and unite the same with said negative electrode, carrier, electrolyte and frame as a unitary structure, introducing into the frame a quantity of carbonaceous material, and subjecting the carbonaceous material to pressure to produce a positive electrode and physically unite the same with said depolarizing mixture.

8. The process of producing a battery cell which consists in applying to a negative electrode a frame, introducing into the frame a carrier coated with an electrolyte, introducing into the frame a quantity of depolarizing mixture, subjecting the depolarizing mixture to pressure to produce a cake of such mixture and unite the same with said negative electrode, carrier, electrolyte and frame as a unitary structure, introducing into the frame a quantity of carbonaceous material, subjecting the carbonaceous material to heat, superimposing upon the carbonaceous material a metallic conductor, and subjecting the conductor and carbonaceous material to pressure to produce a positive electrode in cake form and physically unite the same with said depolarizing mixture and to simultaneously physically unite the metallic conductor to said positive electrode.

9. A battery comprising a negative electrode, a frame of insulating material carried upon each face of said electrode, depolarizing mixture carried within said frames upon opposite sides of said electrode, carbonaceous material carried upon said depolarizing mixture at opposite sides of said negative electrode and constituting positive electrodes of the battery, and a carrier arranged upon opposite faces of said negative electrode, each of said carriers being provided upon opposite sides with an electrolyte.

In testimony whereof, I have affixed my signature to this specification.

HENRY M. ROSENDAL DAM.